United States Patent
Menzies et al.

(10) Patent No.: US 6,654,650 B1
(45) Date of Patent: Nov. 25, 2003

(54) METHODS FOR ERROR PROOFING

(75) Inventors: Richard G. Menzies, Wyoming, OH (US); Terrence O. Dyer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/442,572

(22) Filed: Nov. 18, 1999

Related U.S. Application Data

(60) Provisional application No. 60/157,502, filed on Oct. 4, 1999.

(51) Int. Cl.[7] .............................................. G05B 13/02
(52) U.S. Cl. ........................... 700/32; 700/28; 714/48; 714/52; 714/799; 714/723; 714/124
(58) Field of Search ........................... 714/48, 52, 799, 714/723, 124; 700/28, 32

(56) References Cited

U.S. PATENT DOCUMENTS

| | | | | |
|---|---|---|---|---|
| 5,446,747 A | * | 8/1995 | Berrou | 375/340 |
| 5,737,494 A | * | 4/1998 | Guinta et al. | 706/11 |
| 5,923,014 A | | 7/1999 | Szymusiak et al. | |
| 6,125,196 A | * | 9/2000 | Carey et al. | 235/379 |
| 6,161,101 A | | 12/2000 | Guinta et al. | |

* cited by examiner

Primary Examiner—John Follansbee
Assistant Examiner—Thomas Pham
(74) Attorney, Agent, or Firm—William Scott Andes; Armstorng Teasdale LLP; Robert B. Reeser, III

(57) ABSTRACT

Methods for error proofing, which also improve material, or information, flow through a process, are described. In one embodiment, the method includes the steps of identifying a process responsible for at least one error, process mapping the identified process, identifying at least one step in the identified process at which scrap and/or nonconformance occurred, and razing the identified process. The step of razing, in the one embodiment, is performed by determining whether a plurality of errors throughout the identified process occurs, and if a plurality of errors are identified throughout the identified process, determining whether a different process can be substituted for the identified process, and if the different process can be substituted for the identified process, then substituting the different process for the identified process. If the different process cannot be substituted for the identified process, then the process further includes performing the steps of determining whether the identified step can be eliminated, and if the step can be eliminated, then eliminating the step.

13 Claims, 2 Drawing Sheets

METHODS FOR ERROR PROOFING

CROSS REFERENCE TO RELATED APPLICATIONS

This application claims the benefit of U.S. Provisional Application No. 60/157,502, filed Oct. 4, 1999.

BACKGROUND OF THE INVENTION

Errors in manufacturing processes, such as in aircraft engine manufacturing processes, can result in increasing costs, as well as delivery and production delays. Errors can also occur in other types of processes such as in industrial, financial, design, assembly, and transactional processes. The term "error" refers to performance of an undesirable or incorrect action, or a misinterpretation of instructions essential to correct execution of an action. Errors occur, for example, due to special cause events which are difficult to address by reducing normal process variation.

Error proofing methodologies typically are utilized to reduce scrap and rework. Such methodologies typically focus on a step or point in the process to eliminate errors at that step or point and do not look at removing errors by process razing, substituting a different process, eliminating the process step, or simplifying the process step.

BRIEF SUMMARY OF THE INVENTION

In one embodiment, the method includes the steps of identifying a process responsible for at least one error, process mapping the identified process, identifying at least one step in the identified process at which scrap and/or nonconformances occurred, and razing the identified process. The step of razing, in the one embodiment, is performed by determining whether a plurality of errors occurred throughout the identified process, and if a plurality of errors are identified throughout the identified process, determining whether a different process can be substituted for the identified process, and if the different process can be substituted for the identified process, then substituting the different process for the identified process.

If the different process cannot be substituted for the identified process, then the process further includes performing the steps of determining whether the identified step can be eliminated, and if the step can be eliminated, then eliminating the step. If the step cannot be eliminated, then the process further includes performing the steps of determining whether the identified step can be simplified, and if the step can be simplified, then simplifying the step.

After razing the process, the razed process is error proofed, and then the error proofed razed process is analyzed to verify that scrap and/or nonconformance has been reduced. The above described error proofing methodology facilitates reducing opportunities for errors, and therefore facilitates improving flow of material or information through a process. In addition, such an approach frequently reduces cycle times.

DETAILED DESCRIPTION OF THE INVENTION

An error proofing methodology is described below in the context of aircraft engine manufacturing operations. Such methodology, however, is not limited to practice in aircraft engine manufacturing operations and can be utilized in connection with many other types of processes including, by way of example, industrial, financial, design, assembly, and transactional processes.

Figure 1:
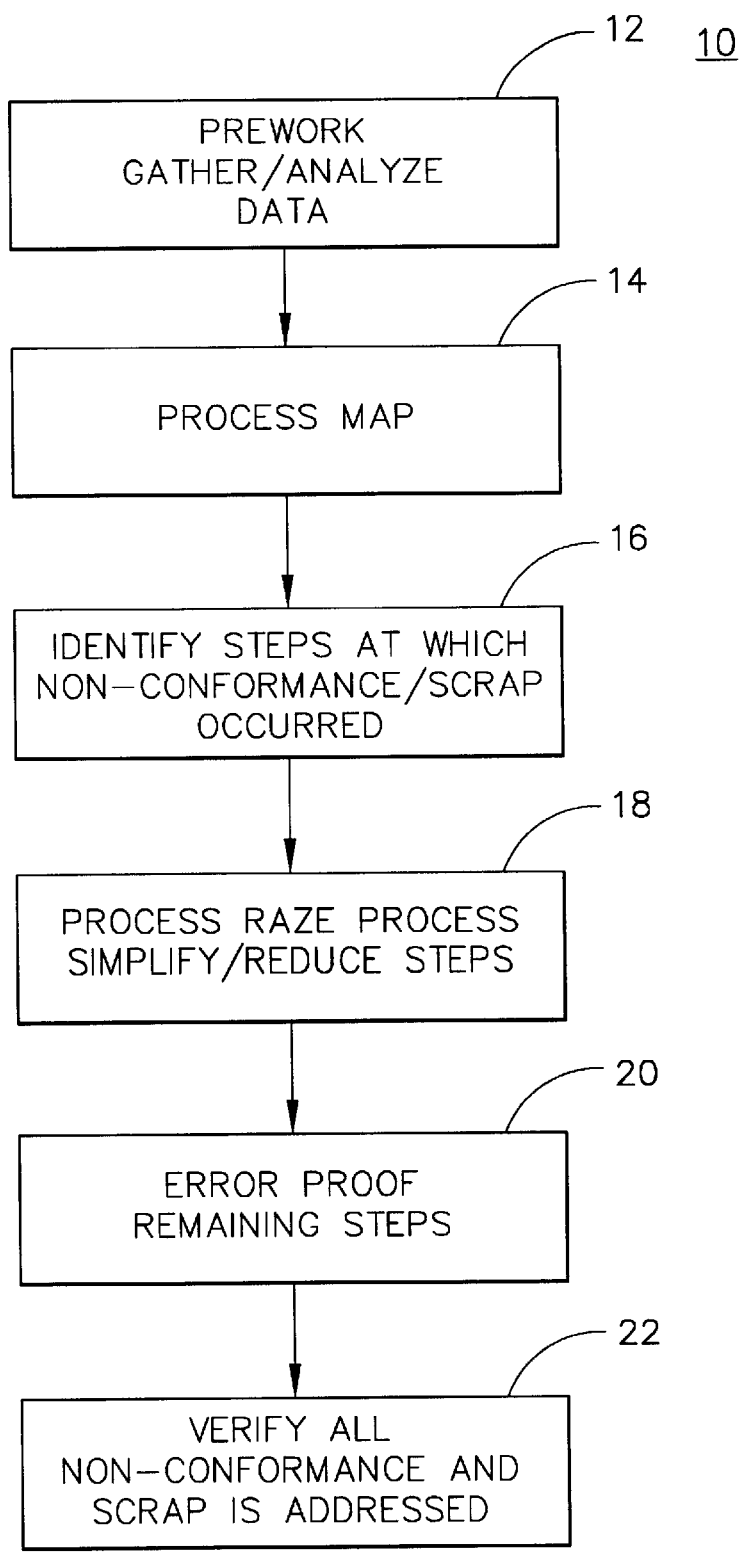
FIG. 1 is a flow diagram illustrating process steps in accordance with one embodiment of the present invention.

FIG. 1 is a flow diagram 10 illustrating process steps in accordance with one embodiment of the present invention. Referring specifically to FIG. 1, and once at least one error has occurred in a process, prework 12 is performed to gather and analyze data. The data includes scrap, rework and nonconformances data. The prework step is performed in order to identify the process responsible for the error and to provide further clues as to the root cause of the error, for example, one machine or operator may show a higher error rate than another.

After performing the prework then a process map 14 of the identified process is generated. More specifically, the process is mapped to identify how a part moves, how information flows, and how much operator intervention is necessary. With the process map and prework data, the steps at which the nonconforming/scrap occurred are identified 16. This step is performed, in one embodiment, by superimposing the scrap and nonconformance data on process map. Further details regarding the process map and superimposing the prework data on the process map are provided below in connection with FIG. 2.

Still referring to FIG. 1, once the steps at which the nonconformance/scrap occurred are identified as explained above, then a process raze 18 is performed. In one embodiment, the process razing is performed by at least one of the following steps.

1. Determining whether the identified step can be eliminated, and if the step can be eliminated, then eliminating the step.
2. Determining whether the identified step can be simplified, and if the step can be simplified, then simplifying the step.
3. Determining whether a different process can be substituted for the identified process, and if a different process can be substituted for the identified process, then substituting the different process for the identified process.

The above described steps can be performed in any order, and additional or fewer steps can be performed in connection with the razing.

In one specific embodiment, the process razing is determined based on whether a plurality of errors are identified throughout the process. If a plurality of errors are identified throughout the process, then it is first determined whether a different process can be used in place of the identified process. If a different process cannot be substituted for the identified process, then razing continues by determining whether the identified step can be eliminated, and if the step can be eliminated, then eliminating the step. If the step cannot be eliminated, then it is determining whether the identified step can be simplified, and if the step can be simplified, then simplifying the step.

Once razing is complete, then the remaining steps are error proofed 20. Such error proofing is performed using any one of the known techniques. The particular error proofing technique selected depends on the particular process, as is well known in the art.

After error proofing the remaining steps, the nonconformance and scrap issues are reviewed to ensure that all such issues have been addressed 22. If all the issues have not been addressed, then the methodology can be re-executed by returning to step 12. If all the issues have been addressed, then the defined process is identified as a possible process to implement.

Figure 2:
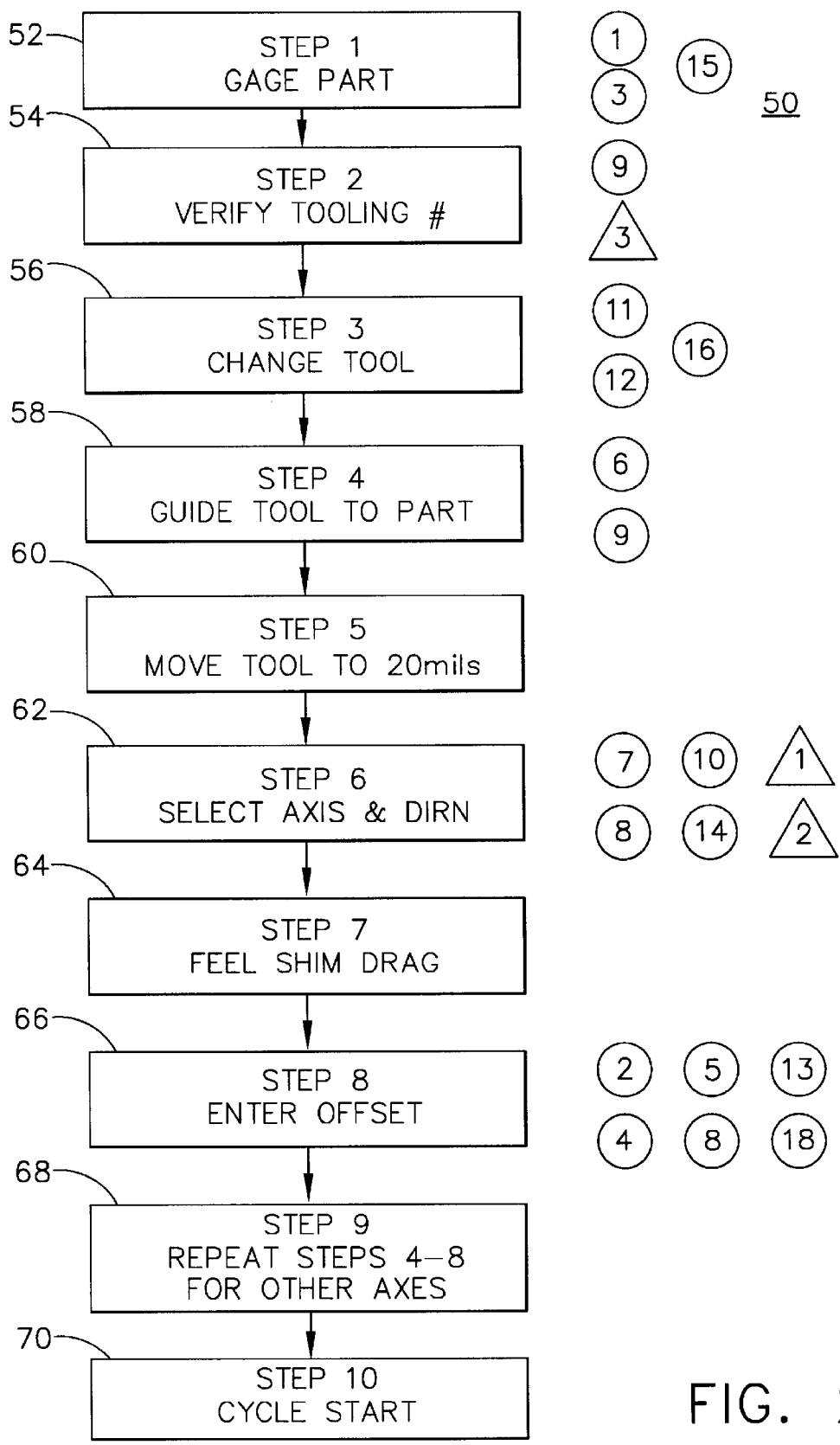
FIG. 2 illustrates a toolset process map.

FIG. 2 illustrates an exemplary process map 50. More specifically, map 50 is a toolset process map for use in connection with manufacture of an aircraft engine component. Ten (10) steps 52–70 are identified in process map 50. Superimposed on map 50 is scrap and nonconformance data. Particularly, scrap data points are indicated by triangles, and are associated with respective steps by being located to the right of the respective step. For example, scrap points 1 and 2 occurred in connection with Step 6 of the toolset process. In addition, nonconforming data points are indicated by circles, and are associated with respective steps by being located to the right of the respective step. For example, nonconforming data point 1 occurred in connection with Step 1 of the toolset process. The process razing is facilitated by superimposing the scrap and nonconformance data on the process map as shown in FIG. 2.

The above described methodology provides the advantage that all nonconformance and scrap issues are addressed in error proofing. Therefore, in addition, the error proofing not only facilitates reducing error opportunities and scrap, but also facilitates the reduction of cycle times.

While the invention has been described in terms of various specific embodiments, those skilled in the art will recognize that the invention can be practiced with modification within the spirit and scope of the claims.

What is claimed is:

1. A method of error-proofing a process, said method comprising the steps of:
   identifying a process responsible for at least one error wherein an error is at least one of performance of an undesirable action, performance of an incorrect action, and misinterpretation of instructions for correct execution of an action, and wherein the process includes a plurality of process steps;
   process mapping the identified process to at least one of identify how a part, being controlled by the process, moves through the process, identify how information, being controlled by the process, flows through the process, and determine a quantity of operator intervention necessary to perform the process;
   identifying at least one step in the identified process at which at least one of scrap and nonconformance occurred;
   razing the identified process by performing at least one of:
      determining whether the identified step within the process can be eliminated, and if the step can be eliminated, then eliminating the step; and
      determining whether the identified step within the process can be simplified, and if the step can be simplified, then simplifying the step; and
      determining whether a different process can be substituted for the identified process; and
   verifying that the at least one of scrap and nonconformance has been reduced in the razed process.

2. A method in accordance with claim 1 further comprising the step of error proofing the razed process before verifying that the at least one of scrap and nonconformance has been reduced.

3. A method in accordance with claim 1 wherein identifying a process responsible for at least one error comprises the steps of collecting at least one of scrap, rework and nonconformance data.

4. A method in accordance with claim 1 wherein if a plurality of errors are identified throughout the identified process, then razing the identified process is performed by first determining whether a different process can be substituted for the identified process.

5. A method in accordance with claim 4 wherein if the identified process cannot be performed by a different process, then razing the identified process further comprises at least one of:
   determining whether the identified step can be eliminated, and if the step can be eliminated, then eliminating the step; and
   determining whether the identified step can be simplified, and if the step can be simplified, then simplifying the step.

6. A method in accordance with claim 5 wherein if the identified step cannot be eliminated, then razing the identified process is performed by determining whether the identified step can be simplified, and if the step can be simplified, then simplifying the step.

7. A method of error-proofing a process, said method comprising the steps of:
   identifying a process responsible for at least one error wherein an error is at least one of performance of an undesirable action, performance of an incorrect action, and misinterpretation of instructions for correct execution of an action, and wherein the process includes a plurality of process steps;
   process mapping the identified process to at least one of identify how a part, being controlled by the process, moves through the process, identify how information, being controlled by the process, flows through the process, and determine a quantity of operator intervention necessary to perform the process;
   identifying at least one step in the identified process at which at least one of scrap and nonconformance occurred;
   razing the identified process by performing at least one of:
      determining whether the identified step within the process can be eliminated, and if the step can be eliminated, then eliminating the step; and
      if the step cannot be eliminated, then determining whether the identified step within the process can be simplified, and if the step can be simplified, then simplifying the step; and
      if the step cannot be eliminated and if the step cannot be simplified, then determining whether a different process can be substituted for the identified process; and verifying that the at least one of scrap and nonconformance has been reduced in the razed process.

8. A method in accordance with claim 7 further comprising the step of error proofing the razed process before verifying that the at least one of scrap and nonconformance has been reduced.

9. A method in accordance with claim 7 wherein identifying a process responsible for at least one error comprises the steps of collecting at least one of scrap, rework and nonconformance data.

10. A method in accordance with claim 7 wherein if a plurality of errors are identified throughout the identified process, then razing the identified process is performed by first determining whether a different process can be substituted for the identified process.

11. A method of error-proofing a process, said method comprising the steps of:

identifying a process responsible for at least one error wherein an error is at least one of performance of an undesirable action, performance of an incorrect action, and misinterpretation of instructions for correct execution of an action, and wherein the process includes a plurality of process steps;

process mapping the identified process to at least one of identify how a part, being controlled by the process, moves through the process, identify how information, being controlled by the process, flows through the process, and determine a quantity of operator intervention necessary to perform the process;

identifying at least one step in the identified process at which at least one of scrap and nonconformance occurred;

razing the identified process by performing at least one of:

determining whether a plurality of errors occur throughout the identified process;

if a plurality of errors are identified throughout the identified process, then determining whether a different process can be substituted for the identified process;

if the different process can be substituted for the identified process, then substituting the different process for the identified process;

if the different process cannot be substituted for the identified process, then determining whether the identified step can be eliminated, and if the step can be eliminated, then eliminating the step; and if the step cannot be eliminated, then determining whether the identified step can be simplified, and if the step can be simplified, then simplifying the step; and verifying that the at least one of scrap and nonconformance has been reduced in the razed process.

12. A method in accordance with claim 11 further comprising the step of error proofing the razed process before verifying that the at least one of scrap and nonconformance has been reduced.

13. A method in accordance with claim 11 wherein identifying a process responsible for at least one error comprises the steps of collecting at least one of scrap, rework and nonconformance data.

* * * * *